(12) United States Patent
Fromherz et al.

(10) Patent No.: US 6,922,681 B2
(45) Date of Patent: Jul. 26, 2005

(54) PROBLEM PARTITIONING METHOD AND SYSTEM

(75) Inventors: Markus P. J. Fromherz, Palo Alto, CA (US); Warren B. Jackson, San Francisco, CA (US); James E. Reich, Mountain View, CA (US)

(73) Assignee: Xerox Corporation, Stamford, CT (US)

(*) Notice: Subject to any disclaimer, the term of this patent is extended or adjusted under 35 U.S.C. 154(b) by 756 days.

(21) Appl. No.: 10/022,719

(22) Filed: Dec. 20, 2001

(65) Prior Publication Data

US 2003/0120620 A1 Jun. 26, 2003

(51) Int. Cl.[7] ................................................. G06E 3/00
(52) U.S. Cl. ........................................... 706/23; 706/19
(58) Field of Search ..................................... 706/23, 19

(56) References Cited

U.S. PATENT DOCUMENTS

| | | | |
|---|---|---|---|
| 5,870,731 A | 2/1999 | Trif et al. ..................... 706/52 |
| 5,963,447 A * | 10/1999 | Kohn et al. .................... 700/49 |
| 6,088,690 A | 7/2000 | Gounares et al. .............. 706/13 |
| 6,144,953 A | 11/2000 | Sorrells et al. ................ 706/60 |
| 6,169,981 B1 * | 1/2001 | Werbos ........................ 706/23 |

* cited by examiner

Primary Examiner—George Davis
(74) Attorney, Agent, or Firm—Linda M. Robb

(57) ABSTRACT

In a problem partitioning method for problem solving in a computer system, a definition of a system to be controlled, a hierarchical control structure definition, problem definitions for a plurality of control nodes in the hierarchical control structure, and a structure evaluation function are used in partitioning the system problem. The partitioning method defines an instantiation of the hierarchical control structure by decomposing the system into a plurality of hierarchical control structure instances, with each control structure instance having a plurality of control levels. The performance of each of the hierarchical control structure instances is evaluated with the structure evaluation function and an optimal hierarchical control structure instance is selected.

34 Claims, 8 Drawing Sheets

PROBLEM PARTITIONING METHOD AND SYSTEM

RELATED APPLICATIONS

This application is related to Ser. No. 09/874,167, filed Jun. 4, 2001, and Ser. No. 09/874,552, "Method and System for Algorithm Synthesis in Problem Solving", filed Jun. 4, 2001, both assigned to the present assignee, the disclosures of which are in their entirety, each specifically incorporated by reference herein.

INCORPORATION BY REFERENCE

The following U.S. patents are fully incorporated herein by reference: U.S. Pat. No. 5,871,731 (Trif et al., "Adaptive Problem Solving Method and System"); U.S. Pat. No. 6,088,690 (Gounares et al., "Method and Apparatus for Adaptively Solving Sequential Problems in a Target System Utilizing Evolutionary Computation Techniques"); and U.S. Pat. No. 6,144,953 (Sorrells et al., "Time-Constrained Inference Strategy for Real-Time Expert Systems").

BACKGROUND OF THE INVENTION

This invention relates generally to the field of computerized problem solving and in particular to a system and method for problem partitioning for the solution of complex problems in real time.

In certain control system applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost micro-electromechanical systems (MEMS) actuators and sensors, and decreasing communication costs, result in systems with unprecedented reconfigurability, flexibility, and robustness. However, networked embedded applications require decision system technology that combines distributed constraint optimization methods with complexity analysis and learning techniques.

Decision systems for such applications have not kept pace with hardware development. Traditionally, decision systems have utilized special-purpose computer programs dedicated to a single task. In various more recent systems, decision systems have utilized model-based computer programs using generic constraint solving (finding a solution to a constraint problem) techniques executed on a single, high-end processor. For example, a simple constraint problem is "determining a roller velocity (desired solution) such that a sheet in a printing system arrives at the next registration station at the desired time (the objective) and the velocity does not exceed the roller's velocity limit (constraint)." An example of distributed embedded software is control software, such as software that controls a machine's functions and runs on multiple networked processors within a machine, instead of a single PC or work station. Embedded applications, such as machine control, usually deal with complex constraint problems that have to be solved within tight real-time constraints, while embedded processors usually have strong resource limitations, such as a slow central processing unit with limited memory.

Constrained optimization is at the core of many embedded applications. In applications such as planning, scheduling, control, and diagnosis, it is necessary to generate timely and accurate solutions such as operational plans, control inputs, fault hypotheses, and recovery actions. The common task in these applications is to repeatedly find a solution for a given objective, a solution that is achievable within or consistent with the system's constraints. Today, such applications are typically hand-coded programs based on an extensive analysis of a fixed configuration and task of the system. However, in order to provide dynamic reconfiguration and fault-tolerant behavior for future networked embedded systems, as is often required in military applications, many synthesis operations must become part of the software's real-time operations. Although the invention described herein is not limited to military applications, the following discussion will pertain to a military situation for purposes of example only.

For example, military hardware often outlasts the usefulness of its technology. To address this issue, it is desirable to upgrade and repurpose existing systems for new tasks instead of investing in new hardware. An unmanned underwater vehicle, for example, is potentially a multi-purpose undersea platform for weapons deployment, reconnaissance missions, mine sweeping, rescue operations, etc. However, upgrading or repurposing such a vessel with new types of subsystems (weapons, sensors, mine-clearing or rescue equipment) is difficult, as the software has to coordinate and control interactions that are strongly dependent on the type, role, and original configuration of the equipment. Detecting and catching a mine, for example, requires taking into account the constraints of sensors, robotic arms, and propulsion, and the resulting constraint problems can be complex. The constraint problem to be solved repeatedly by the robot controller, for instance, may involve hundreds of nonlinear range, torque, and collision constraints for a modular manipulator, with multiple objectives such as reaching the target while conserving energy and minimizing motor noise. Today, such problems cannot be solved in real-time by existing techniques on embedded processors.

The second example is coordination of a large number of distributed embedded subsystems. For instance, the increasing number of hydrophonic sensors (on the order of 30,000 in a missile launcher-class submarine) used by sonars like Flank Arrays involves complex parallel architectures. Dynamically mapping and optimally reconfiguring huge data arrays, intensive workload, and data flows are known to be highly compute-intensive problems. Solutions must fit spatial constraints like processing units, memory organization and size, communication bandwidth, and data/computation locality, as well as temporal properties such as response times and latencies.

A final example is the distributed, fault-tolerant coordination of multiple vehicles. There are many applications that require the use of on-board solving services, from mission planning to optimal vehicle control. For instance, consider a set of aircraft formations autonomously performing a long-term mission behind the forward-edge battle area. Each formation leader performs the tactical (long-range) commanding of the formation, satisfying interoperability and coordination constraints, while all aircraft perform short-term self-control. Today, tasks such as planning, scheduling, and coordination are essentially performed before the mission. They consist of the generation of position-time trajectories according to mission objectives, specific navigation points, hostile and tactical environment constraints, and data correlation requirements. By solving these tasks dynamically and reactively to environment changes and mission updates, again using model-based techniques, the formation's availability and flexibility could be increased dramatically. This requires that the solvers distributed among the vehicles have the capability to adapt to a variety of objectives (mission goal, rules of engagement, detection avoidance, aircraft interaction, etc.), and that they are able to reconfigure themselves if individual aircraft exhibit reduced capabilities or even are disabled under enemy fire.

One approach that may provide a solution for generating robust reconfigurable software is model-based computing, which involves the explicit representation of and reasoning about a system's capabilities, constraints, and objectives at run-time. Because the system model is separated from task-specific algorithms, it can be changed as the system changes, making applications configuration-independent and fault-tolerant. Employing model-based computing on embedded software networks requires constraint solvers specifically optimized for such networks. The constraint problems to be solved arise from physical systems and thus are nearly always are large, hybrid (discrete and continuous), and nonlinear. No single solver algorithm can be expected to be suited for all problems. Instead, solvers have to be able to determine the characteristics of a problem and adapt accordingly. Moreover, solvers have to be able to scale to large problems, which typically means approximating or decomposing problems into subproblems.

Applications running on networked embedded systems present constraint solvers with complex constraint problems that cannot be anticipated off-line. At the same time, constraint solvers must execute within stringent resource limitations in an inherently distributed computing environment. Resorting to anytime algorithms to address real-time requirements, for example, is not sufficient to provide acceptable time-bounded solutions. Real-time application software requires on-line, time-bounded solver execution on processor networks with limited computational capabilities, memory, and communication bandwidth. The solvers must conserve resources and proactively allocate their tasks in a way that effectively utilizes the distributed resources of an embedded network within the allotted time. As a service, a solver should also be both application-independent and customizable to the environment. Thus, there is a need for an approach in which constraint solvers are capable of analyzing, learning from, and ultimately adapting to the presented problems.

There have been various approaches in problem solving techniques, such as U.S. Pat. No. 5,870,731 to Trif et al. titled "Adaptive Problem Solving Method and System," which teaches a problem solving method including retrieving a question from a storage device, outputting the question to an output device, receiving an answer from the user, assigning a fuzzy logic coefficient to the answer, and accessing a learning route authority from the storage device to determine the identity of a subsequent question. Answers to questions are learned through user-provided evaluations in a system that is not designed for autonomous, real-time use.

U.S. Pat. No. 6,088,690 to Gounares et al. titled "Method and Apparatus for Adaptively Solving Sequential Problems in a Target System Utilizing Evolutionary Computation Techniques" discloses a system in which chromosomes are applied to a target system one action at a time and the change in properties of the target system is measured after each action is applied. A fitness rating is calculated for each chromosome based on the property changes produced in the target system by the chromosome. The fitness rating calculation is defined so that successive generations of chromosomes will converge upon desired characteristics. This approach is not based on problem analysis and again is not for real-time use.

Finally, U.S. Pat. No. 6,144,953 to Sorrells et al. titled "Time-Constrained Inference Strategy for Real-Time Expert Systems" teaches a control process and an inference network which assign merit values to each inference node of the inference network. The merit values reflect the processing cost of expanding a node to calculate a likelihood value for the proposition that the node represents. The merit values are then used in the control process to determine which of the nodes will be processed first to calculate likelihood values. This establishes a "best-first" control process, which takes account of the processing cost of each node in the inference network to determine which nodes to evaluate first. However, this approach does not provide the capability of learning from, analyzing and adapting to presented problems.

SUMMARY OF THE INVENTION

Briefly stated, and in accordance with one aspect of the present invention, there is presented a problem partitioning method for problem solving in a computer system, in which a definition of a system to be controlled, a hierarchical control structure definition, problem definitions for a plurality of control nodes in the hierarchical control structure, and a structure evaluation function are used in partitioning the system problem. The partitioning method defines an instantiation of the hierarchical control structure by decomposing the system into a plurality of hierarchical control structure instances, with each control structure instance having a plurality of control levels. The performance of each of the hierarchical control structure instances is evaluated with the structure evaluation function and an optimal hierarchical control structure instance is selected.

In another form, the invention comprises a computer system for partitioning a problem in a computer system, in which an applications controller provides a definition of a system, having a plurality of actuators, to be controlled to a solver distribution module. A decomposition module decomposes the system into a plurality of hierarchical control structure instances. An evaluation module evaluates the performance of each of the hierarchical control structure instance and a control allocation module groups the actuators into modules for hierarchical allocation.

In yet another embodiment the system comprises a computer program product including a computer usable medium having computer readable program code embedded in the medium to cause the partitioning of a problem to be solved by a computer. The computer readable program code causes the computer to decompose the control elements of a system to be controlled into a plurality of hierarchical control structure instances. The computer readable program code also causes the computer to evaluate the performance of each of the hierarchical control structure instances and to select an optimal hierarchical control structure instance.

In another form there is provided a program storage device readable by a machine, tangibly embodying a program of instructions executable by the machine to solve a problem by partitioning the control elements of a system to be controlled. After receiving problem definitions and a structure evaluation function, the partitioning method defines an instantiation of the hierarchical control structure by decomposing the system into a plurality of hierarchical control structure instances, with each control structure instance having a plurality of control levels. The performance of each of the hierarchical control structure instances is evaluated with the structure evaluation function and an optimal hierarchical control structure instance is selected.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
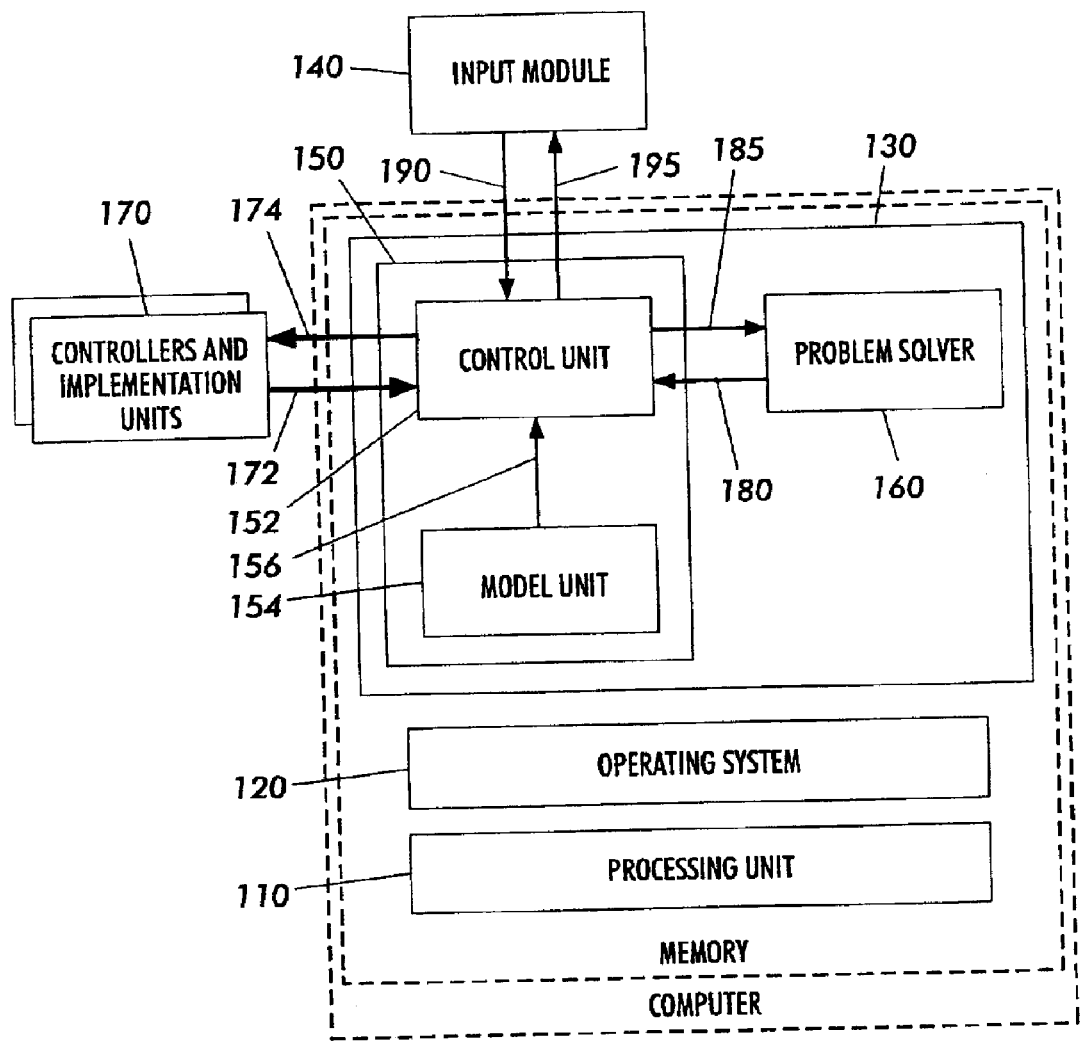
FIG. 1 is a schematic of a representative system incorporating an adaptive constraint solver capable of supporting the solver distribution of the subject invention.

The constraint problem solving service described herein provides constrained optimization services in networked embedded software systems. It includes an adaptive solving feedback loop and an adaptive configuration loop to analyze, decompose, and distribute constraint solving for large-scale problems on networked systems, designed to proactively consider problem characteristics, complexity, and resources in the application.

Complexity analysis includes such methods as models and analysis techniques to predict phase transitions in continuous optimization problems, to assess on-line performance of discrete and continuous solvers, and to prove time-bounded synthesis feasibility and worst-case behavior for specific applications. Additionally, system-specific analysis for decomposition and distribution includes the identification of hierarchical characteristics of the system, for example, the configuration of a printer paper path, consisting of components such as transports, fusers, inverters, etc., which in turn consist of components such as rollers, sensors, etc. System-specific analysis also includes identifying problem subclasses according to physical properties, for example, the positions of actuators in an active surface system such as an air-jet paper mover.

As to distribution, decomposition techniques can be used to exploit a trade-off between computational load and solution accuracy in distributed solving. Such techniques derive a logical configuration from problem decomposition, where subproblems can be solved independently. Solver allocation techniques then distribute and coordinate the solving workload in a physical system architecture, based on knowledge about computing capabilities, data and control flows, and timeliness and reliability constraints provided by the analysis tools. These techniques enable the efficient, scalable, and robust implementation of constraint solving on networked embedded systems.

Various computing environments may incorporate the constraint problem solving program of the invention. The following discussion is intended to provide a brief, general description of suitable computing environments in which the invention may be implemented. Although not required, the invention will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, networked PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Although the adaptive constraint problem solver described herein is not limited to embedded applications, the following discussion will pertain to embedded systems for purposes of example only. One skilled in the art will appreciate that the adaptive constraint problem solver is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

FIG. 1 illustrates one example of how the constraint problem solving program interacts with selected modules of an embedded computer system that is an integral part of a larger computing system or machine. Embedded systems are used to control, monitor or assist an operation being performed by equipment interfacing with the computer system. Typically, an embedded system is housed on a microprocessor board with Read Only Memory (ROM) for storing the programs and Random Access Memory (RAM) for program execution data. Examples of devices utilizing embedded systems include printers, cameras, watches, microwaves, video cassette recorders, automobiles, engineering tools, process control systems, and office and consumer products. Some embedded systems include an operating system, but many are so specialized that the entire logic can be implemented as a single program. Embedded systems may also be controlled by external software, as in a client/server environment. However, embedded systems present resource constraints, such as less memory and a slower processor, which limit their capabilities. The problem solver described herein is able to operate within these resource constraints and increase the functionality of the system by providing the capability of taking into account a wider array of objectives and constraints for the performance of tasks being directed by the system. It gives the system the flexibility of operating in real time with more complex system constraints than is possible with existing systems.

Numerous types of embedded systems exist which may utilize the various embodiments of the problem solver disclosed herein. One example is the transport of paper along a paper path in a copier or printer. This operation is typically performed by rollers applying forces to sheets of paper moving on a paper path through the printer. The rollers are driven by motors, which are controlled by embedded control software which has a specific goal, such as turning on a specific motor at a specific speed at a specific time. This control software is often controlled by higher-level embedded control software. The higher-level control software determines the turn on time of the roller motors and the operating speed necessary for required sheet entry and exit time from a specific paper path segment. This determination is made through consideration of the motors' constraints, feedback from sensors providing information as to the actual location of the sheet, and reaction to faults, etc. The problem solver disclosed herein provides the capability for such a system to control the interaction and timing of the movement of the components along the paper path more effectively and efficiently.

Another example of an embedded system which benefits from the problem solver is the operation of an airplane, rocket, or spacecraft. These devices have multiple components, which operate cooperatively to control the motion of the vehicle. Typically, control software is provided goals such as timing for firing thrusters and the firing level in the case of a rocket or spacecraft, or how far to move a flap or rudder in the case of an airplane. That specific function embedded control software is controlled by higher-level embedded control software, which has the goal of moving the vehicle along a desired trajectory and from that of calculating what each thruster, flap, and rudder should contribute. To perform a turn, the level of a thruster on one side could be increased or a rudder may be moved or both. These calculations must take into consideration the constraints of the individual devices, such as the existing rudder position. In performing a turn, if a rudder is already moved to a maximum angle, more force may be needed from a thruster. The problem solver disclosed herein provides an embedded software module with the capability of handling more complex system control problems within existing system processor and memory constraints.

A final example of an embedded software system that benefits from the use of the problem solver is the operation of an automobile engine. The firing of an automobile's spark plugs is controlled by software that optimizes the time when a spark plug should fire relative to the movement of the piston. The software is given a goal of firing at a certain periodic rate to drive the automobile at a desired speed, and it controls the spark plug firing, taking into account the dynamic constraints of the pistons.

It will be recognized that a computing environment may include various modules, such as a processing unit, system memory, a system bus coupling various system components to the processing unit, an input/output system, a hard disk drive, an optical disk drive, program modules, program data, monitor, various interfaces, peripheral output devices, and/or networked remote computers. However, for the purpose of clarity, FIG. 1 illustrates only those modules within the computing environment which interact with the constraint problem solving program. In particular, the constraint problem solving program resides within a computing module, which includes a processing unit 110, operating system 120, applications module 130 and memory module. The memory module may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device. Applications module 130 may perform many possible tasks, such as configuration management, coordination (directing the interaction of multiple hardware components), planning, scheduling, predictive observer (monitoring a hardware component, extrapolating future behavior from past behavior, and outputting the predicted behavior), system control, and diagnostics. The embodiments of the applications module described herein are exemplary only and do not limit the function of the applications module to those specific tasks.

In this embodiment, applications module 130 includes controller module 150 and adaptive constraint problem solver program 160. Within controller module 150 resides control unit 152, which communicates with model unit 154 through path 156. Path 156 provides control unit 152 with instructions concerning the constraints, such as hardware constraints, within the system and secondary goals for the task to be performed, for example conserving energy or maintaining moving parts at a constant velocity. Control unit 152 communicates with input module 140 through input path 190 and output path 195. Input path 190 provides control unit 152 with instructions as to the primary goal or goals of a task to be performed, for example moving a sheet of paper within a specified time frame or coordinating the movement of vehicles geographically. Output path 195 provides input module 140 with feedback as to an error in the execution of the task, such as when the goal or goals could not be achieved. The error specifies the deviation of the actual state or behavior from the goal state or behavior.

The adaptive constraint problem solver program 160 is interconnected to controller module 150 through control paths 180 and 185. Control path 185 provides adaptive constraint problem solver program 160 with the goals and constraints to be imposed on the system and information on the current state of the implementation units. Control path 180 provides control unit 152 with the solution for the problem presented. Control unit 152 is interconnected to various implementation units 170 through sensor path 172 and control path 174. Sensor path 172 provides the controller with information as to the current state of implementation units 170. Control path 174 provides a control signal to implementation units 170 after receipt of the problem solution from adaptive constraint problem solver 160. Additionally, input module 140 may be connected to model unit 154 through an additional input path, not shown, to provide the capability to modify the constraints or secondary goal input from model unit 154 to control unit 152.

Figure 2:
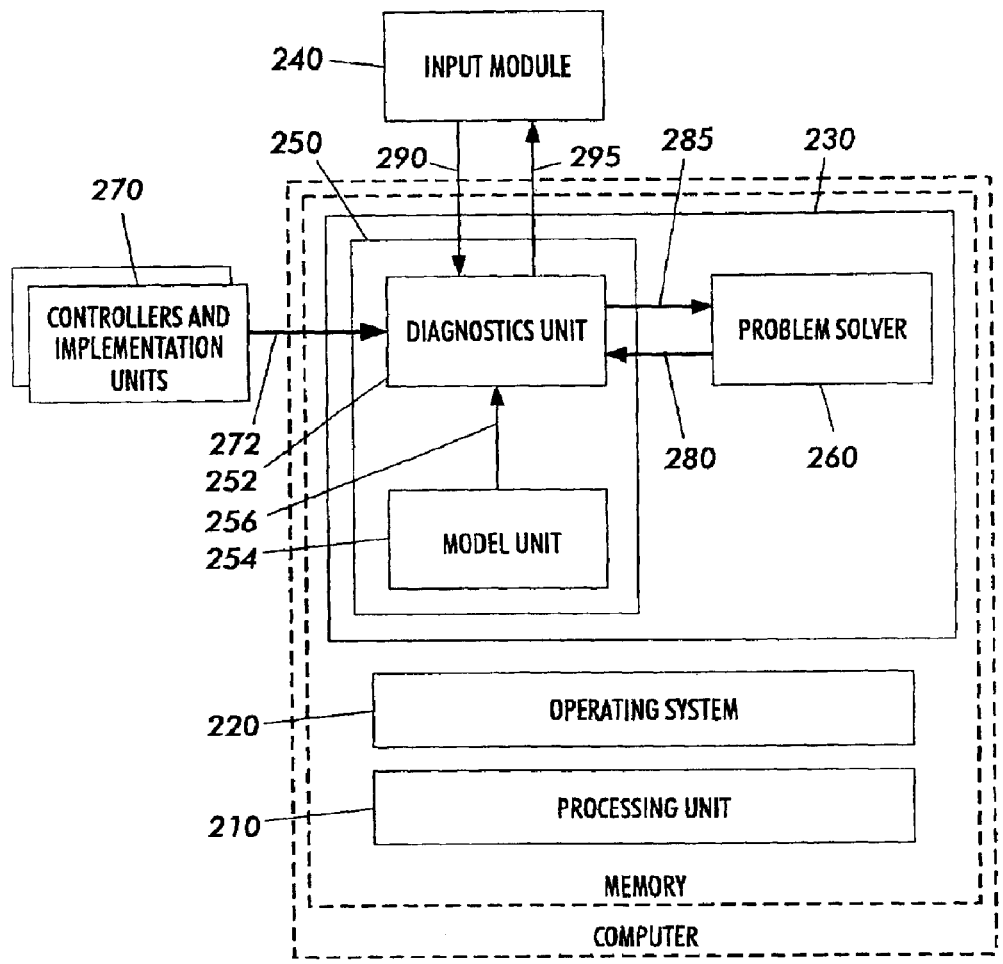
FIG. 2 is a schematic of another representative system incorporating an adaptive constraint solver capable of supporting the solver distribution of the subject invention.

Referring now to FIG. 2, there is shown a second example of how the adaptive constraint problem solver program interacts with modules of a general purpose computing system. Again, for the purpose of clarity, FIG. 2 illustrates only those modules within the computing environment which interact with the constraint problem solving program. Other modules such as those described above may be part of the system. The constraint problem solving program resides within a computing module, which includes a processing unit 210, operating system 220, and applications module 230. In this embodiment, applications module 230 includes diagnostics module 250 and adaptive constraint problem solver program 260. Within diagnostics module 250 resides diagnostics unit 252, which communicates with model unit 254 through path 256. Path 256 provides diagnostics unit 252 with instructions concerning task constraints, such as hardware constraints, within the system and secondary goals for the task to be performed, for example conserving energy. Diagnostics unit 252 communicates with input module 240 through input path 290 and output path 295. Input path 290 provides diagnostics unit 252 with instructions as to the primary fault or faults to be monitored, for example, deviations in the speed of a wheel driven by a motor from the expected speed (because of slippage). Output path 295 provides input module 240 with feedback as to current system status and its deviation from normal behavior. The adaptive constraint problem solver program 260 is interconnected to diagnostics module 250 through paths 280 and 285. Path 285 provides adaptive constraint problem solver program 260 with the goals and constraints to be imposed on the system and information on the current state of the implementation units. Path 280 provides diagnostics unit 252 with the solution for the problem presented. Diagnostics unit 252 is interconnected to various implementation units 270 through sensor path 272. Sensor path 272 provides the diagnostics unit 252 with information as to the current state of implementation units 270.

Figure 3:
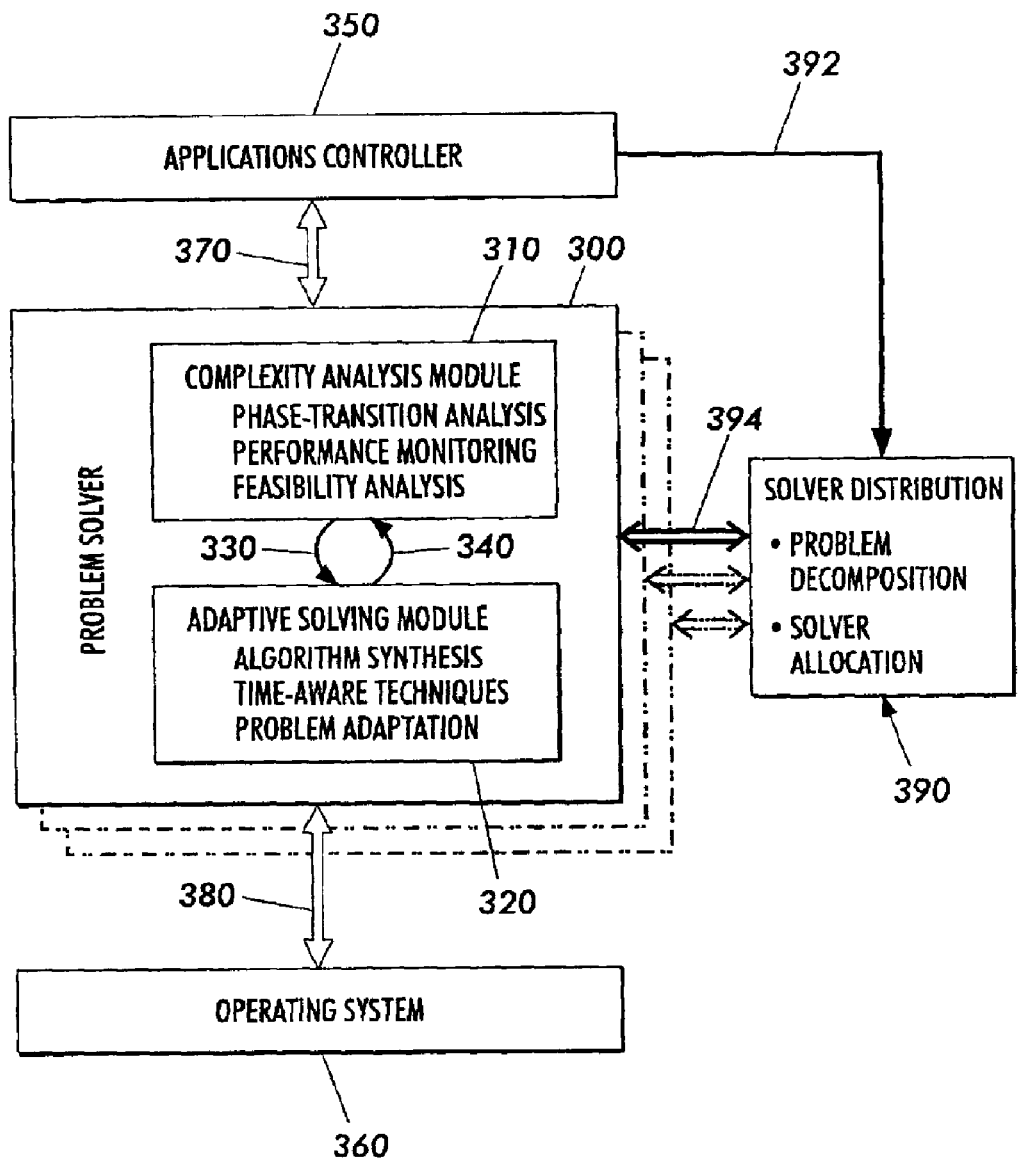
FIG. 3 is a simplified diagram of components for the adaptive constraint solver of the subject invention.

Referring to FIG. 3, there is shown a diagrammatic overview of the components of the adaptive constraint problem solver program with solver distribution according to this invention. Within each controller of the general computer system, there resides an adaptive constraint problem solver program 300, which includes complexity analysis module 310 and adaptive solving module 320. Path 330 and path 340 provide a dynamic feedback loop between complexity analysis and adaptive solving, to consider complexity and resources in the solver program. Within complexity analysis module 310, phase transition analysis provides easy-to-compute information about the average complexity of a given problem, which is complemented by on-line performance monitoring and off-line feasibility/worst-case analysis to guarantee solution timeliness and quality.

The average complexity of a given problem is based on problem characteristics such as the ratio of constraints to variables or average variable domain size. If the ratio of constraints to variables is much less than one, the problem is under-constrained, many solutions exist, and a solution is easy to find. If the ratio of constraints to variables is much greater than one, the problem is over-constrained, and it often is easy to show that no solution exists. The difficult problems exist between these two extremes. In principle, it may be possible to use such information to choose solver algorithms and heuristics that have been shown to perform best on a characterized problem. However, it has been shown that this characterization is only correct on average, and that some problems which appear simple may be among the most difficult to solve. Therefore, it is desirable to augment off-line complexity analysis with on-line performance monitoring and problem adaptation in order to provide real-time guarantees in constraint solving.

Within adaptive solving module 320, the adaptive synthesis of global and local search algorithms provides solving efficiency for problems of varying complexities. This synthesis is supported by time-aware constraint propagation and search techniques that balance effort against expected return. These methods to adapt solver algorithms are complemented with techniques to dynamically adapt problem parameters as needed. All of the adaptation methods are based on complexity analysis results and in turn provide the analysis component with actual performance data.

The structure and connectivity of problem solvers 320 is determined by a solver distribution module 390. The system may include multiple solver distribution modules 390, which may operate off-line or may be included in individual control modules. When included in individual control modules, the solver distribution module determines the next-lower level in a hierarchical control structure. The solver distribution module 390 communicates with an applications controller module 350 along path 392 to receive information as to the system model, which includes the definition of a system to be controlled with a specified number of control elements, and a control model, which includes a hierarchical control structure and problem definitions for control nodes in the control structure. Information received from applications module 350 also includes performance evaluation functions, which evaluate a control performance structure instance (described hereinbelow). It may also include a performance evaluation function for solving problems at different nodes in a structure. Each solver distribution module 390 communicates with a corresponding problem solver module 300 along path 394.

Within solver distribution module 390, problem decomposition provides the identification of hierarchical characteristics of the system or the identification of system subclasses according to physical properties. Solver allocation techniques then distribute and coordinate the solving workload in a physical system architecture, based on knowledge about computing capabilities, data and control flows, and timeliness and reliability constraints. For an active surface, for example a surface with a two-dimensional array of actuators that together push an object placed on top of the surface, the solutions to subproblems must add up to the required total, and if the objectives of one or more subproblems cannot be achieved, others may have to compensate. The problems can be described as constraint problems to be solved in a control module.

Figure 4:
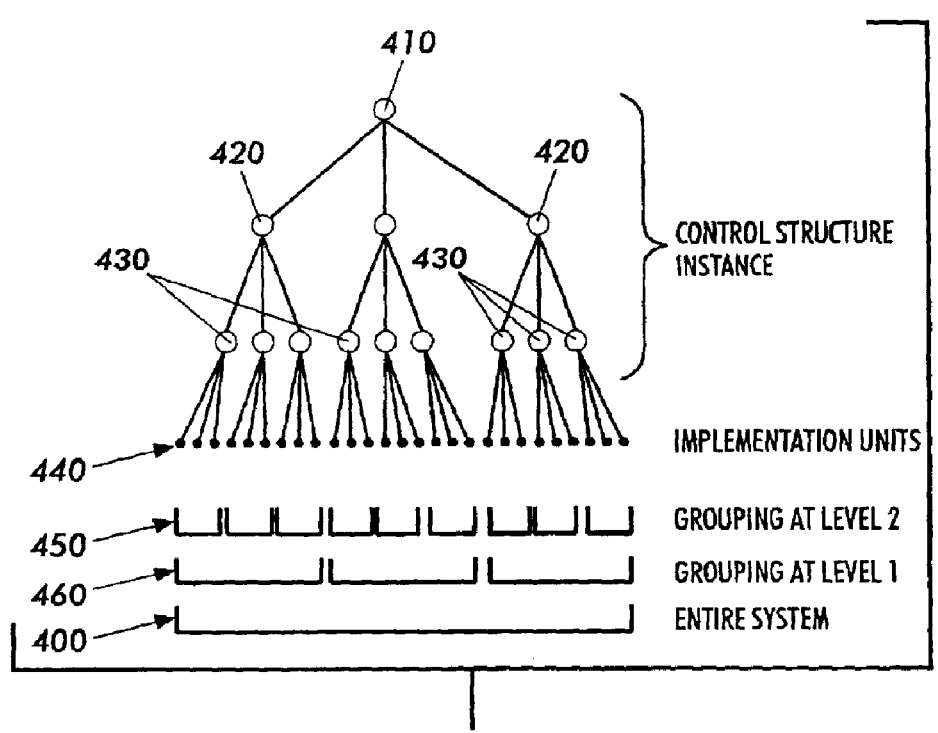
FIG. 4 is a diagram of a problem partitioning approach according to the subject invention.

For problems with thousands of variables and constraints, representing an equal number of distributed but connected physical elements in large-scale networked embedded software systems, it is often both infeasible and unnecessary to solve the constrained optimization problem as a single problem on a single processor. For example, a core problem in controlling systems with large numbers of actuators, including smart matter systems, is the allocation of actuation from a relatively small number of degrees of freedom to a very large number of degrees of freedom. One approach to actuation allocation is hierarchical methods as illustrated in FIG. 4. In this approach the system 400 is decomposed into control modules 410, which are allocated to first. Each control module 410 may be further decomposed into control submodules 420, to which actuation is allocated, and so on down the hierarchy to control submodules 430 until a module consists of a single actuator or implementation unit 440. For the purposes of illustration, only two subgroupings are shown, but it will be appreciated that for a specific system, additional or fewer subgroupings may be beneficially employed. For the purposes herein, the grouping of control modules and submodules is defined as a control structure instance. The grouping for the level 1 submodules, which includes one submodule 420 with its submodules 430 and actuators 640, is indicated at grouping level 460. The grouping for the level 2 submodules, which includes one submodule 430 and its actuators 440, is indicated at grouping level 450. Hierarchical algorithms are well-suited for the allocation problem because they scale well, they can be distributed, and they can still be optimal or approximately optimal because of the global information passed down the hierarchy.

This approach is enabled by the fact that systems having tens or hundreds of thousands of sensors and actuators, whether discrete or continuous at the individual element level, approach a continuum in the limit and thus can be approximated by much lower-dimensional continuous models at higher levels. For example, an active surface with thousands of sensors and actuators can be approximated by a surface with only dozens of sensor and actuator modules, each composed of actual sensors and actuators. Secondly, such large-scale problems are often self-similar at multiple levels. For example, if the original constraint problem states that the sum of a given number of active actuators has to be equal to a desired total, this constraint is preserved if the individual actuators are aggregated into a number of modules such that the desired total is equal to the sum of the modules, with each module equal to the sum of its actuators. Instead of finding a solution to the original problem having a large order of magnitude, it is now possible to find a solution to a much smaller problem and then allocate a solver to each subproblem. Third, different groupings can lead to widely different computational complexities at lower levels. Even if the abstraction into modules is fixed ahead of time, it is still possible to decide dynamically which actuators to group into which modules, for example, based on run-time information about available actuators. Besides making use of the complexity analysis techniques, it is also possible to discover structure in constraint problems that can be exploited by solvers for the subproblems. For example, grouping constraints into equivalence classes can significantly alter computational complexities. Problem characteristics such as constraint equivalence seem to be common in systems where constraints arise out of (often uniform) physical characteristics.

Figure 5:
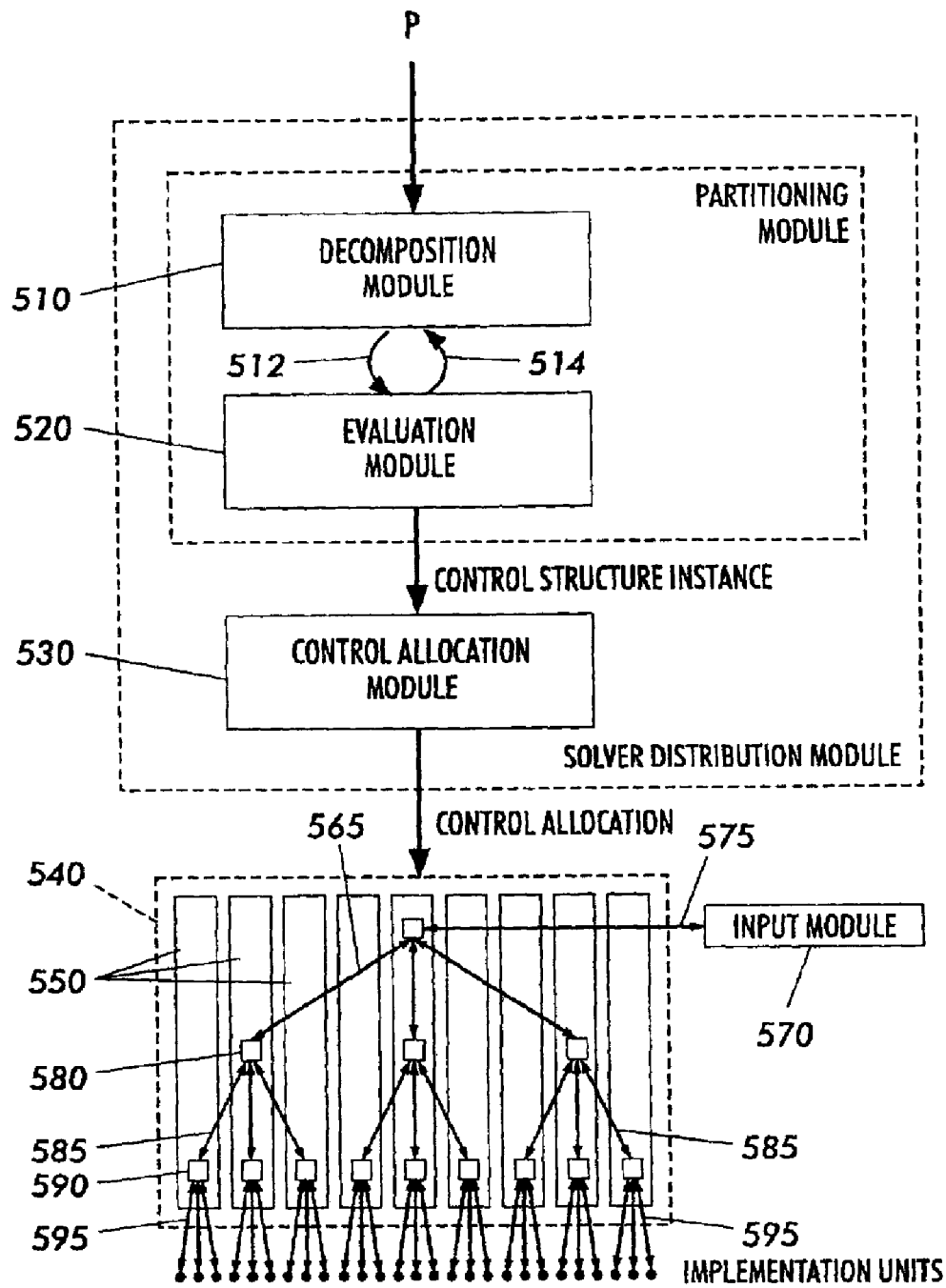
FIG. 5 is a block diagram of one embodiment of the subject invention, further illustrating the controllers and implementation units according to FIG. 1.

Referring to FIG. 5, there is shown an embodiment of the solver distribution module according to the invention. In this embodiment, problem input P is provided to decomposition module 510 within the partitioning module, which also includes evaluation module 520. The decomposition module decomposes the system in different ways according to a specified structure and communicates this information to the evaluation module through path 512. For example, a specified control structure may require that actuators be grouped progressively as illustrated in FIG. 4. In that case, a selection criterion for decomposition is specified to determine how to group actuators at each level. A more specific structure may implicitly include the selection criterion, for example by specifying that N actuators of an active surface be grouped into groups of adjacent actuators, or into groups of rows and columns (actuators with identical y and x positions, respectively). In that case, the number of actuators in each group and the number of levels in the hierarchy are still open and have to be instantiated by the partitioning method, but if multiple such structures are defined, then the method not only instantiates them, but also chooses between them.

Evaluation module 520 evaluates the control structure instances with respect to the structure evaluation function to determine whether the structure is optimal. If the structure is not optimal, this information is communicated to decomposition module 510 by path 514, in the form of, for example, a numeric value for the quality of the instance or additional information to guide the decomposition module.

The evaluation function may add up the cost of computation and communication required for the given hierarchical structure. For example, in a three-level hierarchy, N actuators may be grouped into M groups with N/M actuators per group: there is 1 node at the top level, M nodes at the second level, and N/M nodes in each group at the third level, as shown in FIG. 4. The communication cost may be calculated simply as the number of levels in the hierarchy or a more sophisticated model may be used, taking into account the available communication subsystem (for example, the network infrastructure). Similarly, the computational cost for the whole structure may be calculated as the number of nodes in the graph or as the maximum number of control modules per control node 550, or a more sophisticated model of the problem solving process may be employed.

In addition to these objective functions, the evaluation function may include constraints, such as constraints on the total amount of time and the total amount of memory available for the task. In this case, a valid structure is one that satisfies the constraints. As an alternative or complement to time complexity, the evaluation function may also consider solution quality. Solution quality often depends on the structure of the hierarchy (for example, fewer levels may result in faster solutions, but poorer solution quality). Generally, both time complexity and solution quality may be based on analytical models that compute these measures from parameters of the structure or on statistical models that are computed through experiments.

If the structure is optimal, evaluation module 520 provides the control structure instance to control allocation module 530 through path 525. Control allocation module 530 then groups the actuators into modules for hierarchical allocation and communicates this information to system 540 via path 535. System 540 distributes the allocation to control nodes 550, each of which is structured as the nodes in either FIG. 6 or FIG. 7 and described hereinbelow. The problem solution is communicated between control modules and to implementation units through paths 585 and 595 as described for FIGS. 6 and 7.

Figure 6:
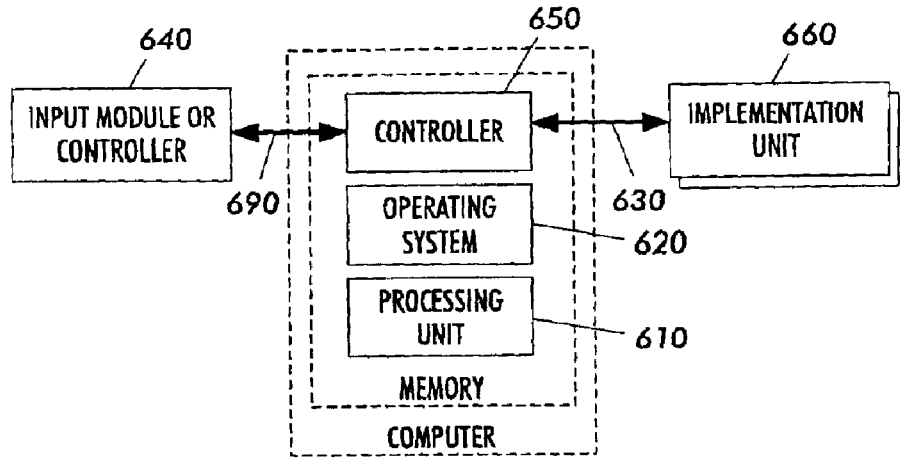
FIG. 6 is a simplified schematic of a representative system incorporating an adaptive constraint solver and the solver distribution of the subject invention.

Referring now to FIG. 6, there is shown a simplified example of a possible configuration of modules of a general purpose computing system configured to include a constraint solver and problem distribution modules. Again, for the purpose of clarity, FIG. 6 illustrates only those modules within the computing environment which interact with the constraint problem solving program and the problem distribution modules. Other modules such as those described above may be part of the system. The constraint problem solving program and the distribution module reside within a computing module, which includes a processing unit 610, operating system 620, and controller module 650. In this embodiment, controller module 650 includes an adaptive constraint problem solver and a problem distribution module (as shown in FIG. 1). Controller 650 communicates with input module 640 through two-way communication path 690. Input path 690 provides controller 650 with instructions as to the primary goal or goals of a task to be performed, for example allocating a desired actuation in a specified area, while output path 690 provides input module 640 with feedback as to an error in the execution of the task, such as when the goal or goals could not be achieved. Controller 650 is also interconnected to various implementation units 660 through control and sensor paths 630. Sensor path 630 provides the controller 650 with information as to the current state of implementation units 660. Control path 630 provides a control signal to implementation units 660 after receipt of the problem solution from the problem solver in controller 650.

Figure 7:
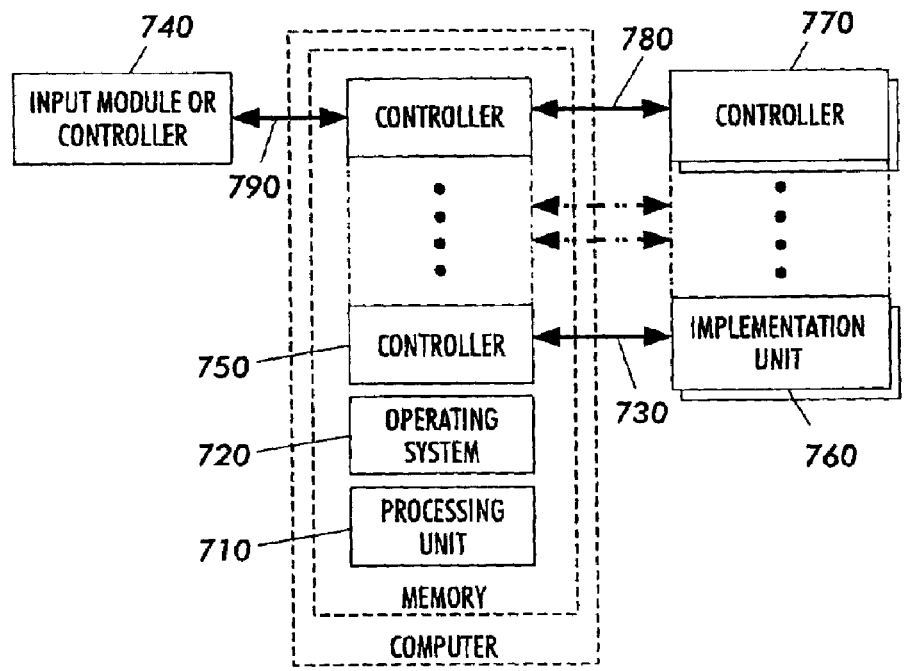
FIG. 7 is a schematic of another representative system incorporating an adaptive constraint solver capable of supporting the solver distribution of the subject invention.

Referring now to FIG. 7, there is shown another simplified example of a possible configuration of modules of a general purpose computing system configured to include a constraint solver and problem distribution modules. Again, for the purpose of clarity, FIG. 7 illustrates only those modules within the computing environment which interact with the constraint problem solving program and the problem distribution modules. Other modules such as those described above may be part of the system. The constraint problem solving program and the distribution module reside within a computing module, which includes a processing unit 710, operating system 720, and a plurality of controller modules 750. In this embodiment, each controller module 750 includes an adaptive constraint problem solver and a problem distribution module (not shown). Controllers 750 communicate with input module 740 through two-way communication path 790. Input path 790 provides controllers 750 with instructions as to the primary goal or goals of a task to be performed, for example allocating a desired actuation in a specified area, while output path 790 provides input module 740 with feedback as to an error in the execution of the task, such as when the goal or goals could not be achieved. Each controller 750 is also interconnected to various implementation units 760 through control and sensor paths 730. Sensor paths 730 provide the controllers 750 with information as to the current state of implementation units 760. Control paths 730 provide control signals to implementation units 760 after receipt of the problem solution from the problem solvers in controllers 750. Additionally, some of the plurality of controllers 750 may be interconnected to various external control modules 770 over two-way communication path 780. Communication path 780 provides operational instruction, for example task goals, from controllers 750 to external control modules 770 and also provides controllers 750 with information of the current state, for example deviations from the goals, of external control modules 770.

Figure 8:
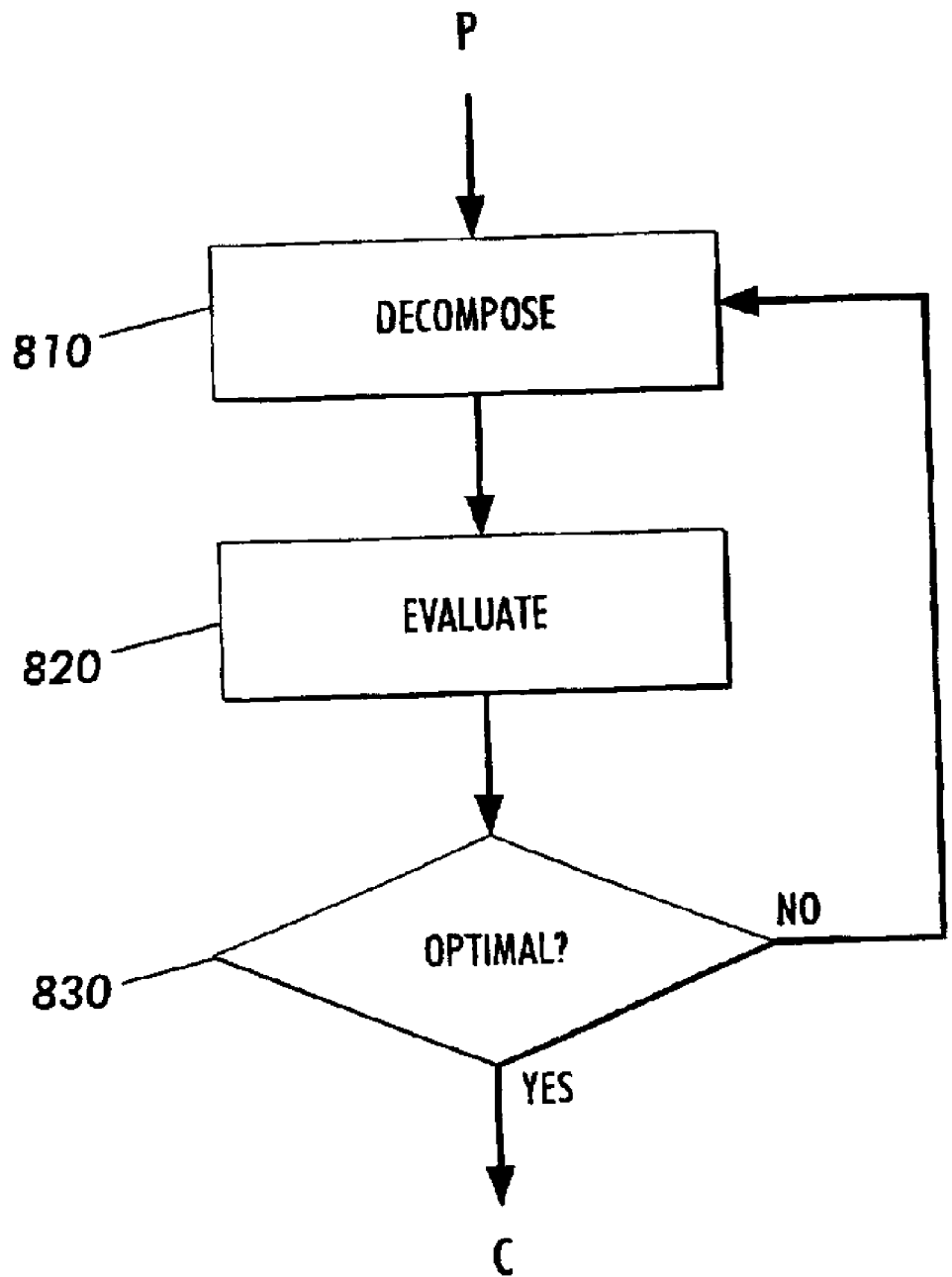
FIG. 8 is a flowchart of one embodiment of the subject invention.

FIG. 8 illustrates a flow chart, which describes the operation of one embodiment of the partitioning module illustrated in FIG. 7. In FIG. 8, problem input P, including the system model, control model, and structure evaluation functions, are sent to step 810, which decomposes the system in different ways according to a specified structure and provides this information to evaluation step 820. At evaluation step 820 the structure instances are evaluated with respect to the structure evaluation function. If the structure instances are optimal, they are sent as C to a control allocation module (not shown). If the structure instances are not optimal, they are returned to decompose step 810 for further or revised decomposition. In one proposed embodiment, the invention for automatic "optimal" decomposition consists of a method for describing the actuators that enter the system's constraints, together with a method for determining the decomposition. By "optimal" decomposition is meant a decomposition that simplifies problem solving at lower levels more than other decompositions.

While different decompositions have different complexities, it may be difficult to analyze such complexity in order to determine suitable decompositions. Instead, equivalence classes are found for the set of actuators in the system. Here, an equivalence class is defined as a set of actuators that are all equivalent, or interchangeable, with respect to one or more constraints of the control problem. Being equivalent means that at the lower level the actuators' effects are indistinguishable with respect to the chosen constraints. In order to find equivalence classes, the constraints are represented in a way that makes the selectors of its components explicit. For the purposes herein, selectors are defined as attributes such as position and direction that distinguish the actuators used in the constraints.

For the embodiment of an actuation allocation problem, where the constraint problem describes how individual forces from individual implementation units or aggregations therefore together deliver larger aggregate forces, attributes such as force, direction, position, etc. partly characterize the constraints of the problem. Attribute direction means the direction of a force, and attributes x-position and y-position mean x and y positions of that force, respectively. Given such attributes, it is possible to find different equivalence classes. Possible equivalence classes include (a) actuators with identical direction, (b) actuators with identical direction and one identical position component (x or y, i.e., actuators in the same row or column with force directions perpendicular to the row or column), (c) actuators with identical direction and x and y position, (d) actuators with identical force magnitude, and any combination of these. In the last case, the equivalence classes consist of only a single actuator each.

One approach to determining a suitable equivalence class choice is to first enumerate all sets of actuators where one or more attributes are identical within the set. Then each equivalence class choice is evaluated with respect to the system's constraints. A choice is suitable if one or more constraints can be simplified within the equivalence classes. A simplification is possible if either a required attribute value (for example, direction='y') is not available in a class, or if all actuators have identical values for a required attribute (for example, x-position=$v_1$=constant for all actuators) in the class. In the former case, part or all of a constraint may be eliminated. In the latter case, the constraint may be simplified. Thus, equivalence may have two distinct effects on problem transformation when decomposing a problem between levels in a hierarchy: simplifying the constraints, and allowing for arbitrary variable selection in a combinatorial problem with multiple constraints. In the actuation allocation problem, this information can be used to group the actuators into modules for hierarchical allocation.

For example, a possible embodiment is a surface with a two-dimensional array of actuators that together push an object placed on top of the surface. The system description includes in particular the positions $(x_i, y_i)$ directions (or orientations) $d_i$, and forces $f_i$ of the individual actuators. (For $f_i$, the x component of the force is $f_{xi}$, and the y component of the force is $f_{yi}$.) In this example, positions and directions are fixed, while forces can be changed, such as by opening and closing a valve if the actuator is an air jet, or by turning on a motor if the actuator is a roller, or by applying an electrical voltage if the actuator is a mechanical finger. Typically, it is desired to deliver total forces $F_x$, $F_y$ and $T_z$ onto the object to be moved by allocating appropriate values to the forces of the individual actuators. For the air jet example, sample constraints are $$F_x = \sum_{i=1}^{N} f_{xi}$$

$$F_y = \sum_{i=1}^{N} f_{yi}$$

$$T_z = \sum_{i=1}^{N} x_i f_{yi} - \sum_{i=1}^{N} y_i f_{xi}$$

and sample objectives are $$\text{minimize} \sum_{i=1}^{N} f_{xi}^2 + \sum_{i=1}^{N} f_{yi}^2.$$

This problem definition is generic for any group of actuators, whether for the entire surface or a part of it. A possible selection criterion may be to represent the example problem above by the actuator information it uses, for example, for the constraints above Constraint 1: uses x-force Constraint 2: uses y-force Constraint 3: uses y-force with x-position and x-force with y-position.

A subgroup of actuators may be selected such that there is no y component to the forces in that subgroup (that is, all actuators in the group only push in the x direction), and the problem can be simplified by removing the second constraint and part of the third constraint, leaving $$F_x = \sum_{i=1}^{N} f_{xi}$$

$$F_y = 0$$

$$T_z = -\sum_{i=1}^{N} y_i f_{xi}$$

Another subgroup may be such that there is no y component to the forces and all actuators have the same y position y, that is, the problem is now defined by the following constraints:

$$F_x = \sum_{i=1}^{N} f_{xi}$$

$$F_y = 0$$

$$T_z = -y \sum_{i=1}^{N} f_{xi}$$

Figure 9:
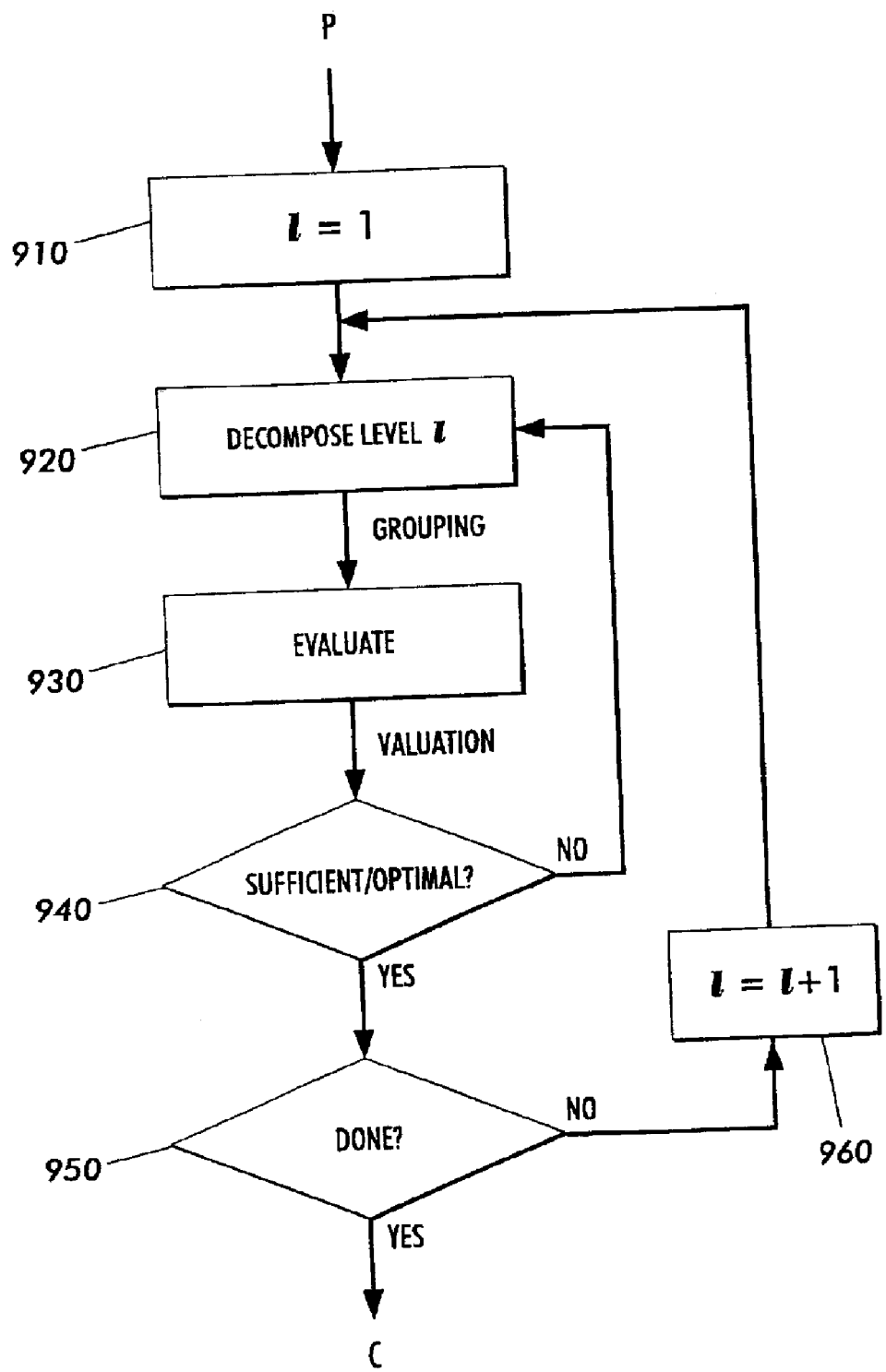
FIG. 9 is a flowchart of an alternate embodiment of the subject invention.

FIG. 9 illustrates a flowchart for an alternate embodiment of the subject invention. In this embodiment, problem input P, including the system model, control model, and problem evaluation functions, are sent to step 910, which sets a level index variable to 1, which is sent to step 920, which decomposes the control nodes at this level into various possible grouping configurations and provides this grouping configuration information to evaluation step 920. At evaluation step 920 the first grouping configuration is evaluated with respect to the problem evaluation function. At step 940 a decision is make as to whether the first grouping configuration is sufficient or optimal. If it is not optimal, the process returns to decompose step 920 for a second grouping configuration; if this grouping configuration is optimal, it is sent to step 950, where a determination is made as to whether decomposition should proceed to another level or to selected levels. If further decomposition is necessary, the level is incremented and returned as input to decompose step 920 and groups at selected levels are repartitioned. For example, if the subgroups resulting from the decomposition at level 1 still concern large numbers of actuators, or if the constraint problems in the subgroups are still considered to complex for processsing, a further level of decomposition may be added. If sufficient levels of decomposition are present, the chosen grouping configuration for each level is provided to the control allocation module.

While the present invention has been illustrated and described with reference to specific embodiments, further modification and improvements will occur to those skilled in the art. For example, any of the embodiments described herein could perform their desired function without the presence of on-line adaptation, the comparison of expected behavior with actual behavior. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A problem partitioning method for problem solving in a computer system, wherein the method comprises the steps of:
   receiving the definition of a system to be controlled, wherein said system is controlled by a plurality of control elements;
   receiving at least one hierarchical control structure definition including a plurality of structure parameters;
   receiving problem definitions for a plurality of control nodes in said hierarchical control structure;
   receiving a structure evaluation function; and
   defining an instantiation of said hierarchical control structure comprising the steps of:
   decomposing said system into a plurality of hierarchical control structure instances, wherein each of said hierarchical control structure instances includes a plurality of control levels, wherein each of said control levels includes at least one control node;
   evaluating the performance of each of said hierarchical control structure instances with said structure evaluation function; and
   selecting an optimal hierarchical control structure instance.

2. The problem partitioning method according to claim 1, wherein said plurality of structure parameters includes the number of nodes to be included at each level of said hierarchical control structure.

3. The problem partitioning method according to claim 1, wherein said plurality of structure parameters includes the number of levels to be included in said hierarchical control structure.

4. The problem partitioning method according to claim 1, further comprising the step of receiving a problem evaluation function for evaluating problem solving complexity for individual control nodes within said hierarchical structure.

5. The problem partitioning method according to claim 4, further comprising the steps of:
   decomposing said hierarchical control structure from a first level by organizing said control elements into a plurality of hierarchical control structure configurations according to a grouping criterion, thereby forming a plurality of possible group configurations for said first level, wherein each said group configuration includes not less than one control node;
   evaluating the performance of each of said group configuration with said problem evaluation function; and
   selecting one said group configuration as optimal;
   defining said selected group configuration as a second level;
   determining whether each of said groups within said selected group configuration satisfies a decomposition criterion; if said groups do not satisfy said decomposition criterion, decomposing said second level of control elements into a plurality of subgroups according to a grouping criterion, thereby forming a plurality of possible subgroup configurations;
   evaluating the performance for each subgroup within each said subgroup configuration with said problem evaluation function;

selecting one said subgroup configuration as optimal, said subgroup configuration defining a next level;

determining whether each of said subgroups within said selected subgroup configuration satisfies said decomposition criterion;

repeating the steps of decomposing said next level of control elements into a plurality of subgroups to form a plurality of possible subgroup configurations, evaluating the performance for each subgroup within each said subgroup configuration, selecting one said subgroup configuration as optimal, and determining whether each of said subgroups within said selected subgroup configuration satisfies said decomposition criterion until the groups satisfy said decomposition criterion; and discontinuing decomposition when said subgroups satisfy said decomposition criterion.

6. The problem partitioning method according to claim 5, wherein only group configurations at selected levels are repartitioned.

7. The problem partitioning method according to claim 5, wherein said decomposition criterion comprises specifying a maximum number of control elements.

8. The problem partitioning method according to claim 5, wherein said decomposition criterion comprises specifying a level of complexity determined by the problem evaluation function.

9. The problem partitioning method according to claim 4, wherein said problem evaluation function is based on the structure of the problems to be partitioned.

10. The problem partitioning method according to claim 9, wherein said structure comprises a number of problem constraints in a problem to be partitioned and the number of expressions in said problem constraint terms.

11. The problem partitioning method according to claim 4, wherein said problem evaluation function is based on a performance model for solving problems with specific characteristics.

12. The problem partitioning method according to claim 11, wherein said specific characteristics comprise a number of problem constraints for the problem to be partitioned.

13. The problem partitioning method according to claim 11, wherein said specific characteristics comprise the number of variables in the problem to be partitioned.

14. The problem partitioning method according to claim 1, wherein the step of selecting an optimal control structure configuration comprises creating groups of elements having equivalent properties.

15. The problem partitioning method according to claim 14, wherein said equivalent properties comprise one or more of identical position, identical direction, one identical position component, identical position, or identical force magnitude.

16. The problem partitioning method according to claim 1, wherein the step of selecting an optimal control structure configuration comprises using a fixed policy.

17. The problem solving method according to claim 16, wherein said fixed policy comprises grouping neighboring control elements.

18. The problem partitioning method according to claim 1, wherein said structure evaluation function measures the time complexity of the problem to be solved.

19. The problem partitioning method according to claim 1, wherein said structure evaluation function measures the quality of solutions for the problem to be solved.

20. The problem partitioning method according to claim 1, wherein said structure evaluation function measures both the time complexity and the quality of solutions of the problem to be solved.

21. The problem partitioning method according to claim 1, wherein said system further comprises a plurality of hierarchical control structures, wherein each one of said plurality of hierarchical control structures includes its associated problem definitions and structure evaluation function.

22. The problem partitioning method according to claim 21, further comprising:

decomposing said system by decomposing each one of said plurality of hierarchical control structures; and evaluating said system by evaluating each control structure configuration for each one said plurality of hierarchical control structures with said associated structure evaluation function.

23. The problem partitioning method according to claim 1, wherein said partitioning is performed on-line.

24. The problem partitioning method according to claim 1, wherein said structure evaluation function measures the memory use complexity of the problem to be solved.

25. A computer system for problem solving wherein the improvement is a problem partitioner, comprising:

an application controller for providing a definition of a system to be controlled to a solver distribution module, said system to be controlled having a plurality of actuators;

a decomposition module within said solver distribution module for decomposing said system into a plurality of hierarchical control structure instances;

an evaluation module for evaluating the performance of each of said hierarchical control structure instances; and a control allocation module for grouping the actuators into modules for hierarchical allocation.

26. A computer system for problem solving according to claim 25, wherein said applications controller further provides a hierarchical control structure definition including a plurality of structure parameters to said solver distribution module.

27. A computer system for problem solving according to claim 25, wherein said applications controller further provides problem definitions for a plurality of nodes in said hierarchical control structure.

28. A computer system for problem solving according to claim 25, wherein said evaluation module select s an optimal hierarchical control structure instance.

29. A computer program product comprising:

a computer usable medium having computer readable program code means embedded in said medium for causing the partitioning of a problem to be solved by a computer, the computer readable code comprising:

computer readable program code means for causing said computer to decompose the control elements of a system to be controlled into a plurality of hierarchical control structure instances;

computer readable program code means for causing said computer to evaluate the performance of each of said hierarchical control structure instances; and computer readable program code means for selecting an optimal hierarchical control structure instance.

30. A program storage device readable by a machine, tangibly embodying a program of instructions executable by the machine to perform method steps for solving a problem by partitioning the control elements of a system to be controlled, said method steps comprising:

receiving problem definitions;

receiving a structure evaluation function; and defining an instantiation for a hierarchical control structure comprising the steps of:

decomposing said system into a plurality of hierarchical control structure instances, wherein each of said hierarchical control structure instances includes a plurality of control levels, wherein each of said control levels includes at least one control node;

evaluating the performance of each of said hierarchical control structure instances with said structure evaluation function; and selecting an optimal hierarchical control structure instance.

31. The program storage device according to claim 30, wherein said problem definitions includes a hierarchical control structure having a plurality of structure parameters.

32. The program storage device according to claim 31, wherein said plurality of structure parameters includes the number of levels to be included in said hierarchical control structure.

33. The program storage device according to claim 30, further comprising the step of receiving a problem evaluation function for evaluating problem solving complexity for individual control nodes within said hierarchical structure.

34. The program storage device according to claim 33, further comprising the steps of:

decomposing said hierarchical control structure from a first level by organizing said control elements into a plurality of hierarchical control structure configurations according to a grouping criterion, thereby forming a plurality of possible group configurations for said first level, wherein each said group configuration includes not less than one control node;

evaluating the performance of each of said group configuration with said problem evaluation function; and selecting one said group configuration as optimal;

defining said selected group configuration as a second level;

determining whether each of said groups within said selected group configuration satisfies a decomposition criterion; if said groups do not satisfy said decomposition criterion, decomposing said second level of control elements into a plurality of subgroups according to a grouping criterion, thereby forming a plurality of possible subgroup configurations;

evaluating the performance for each subgroup within each said subgroup configuration with said problem evaluation function;

selecting one said subgroup configuration as optimal, said subgroup configuration defining a next level;

determining whether each of said subgroups within said selected subgroup configuration satisfies said decomposition criterion;

repeating the steps of decomposing said next level of control elements into a plurality of subgroups to form a plurality of possible subgroup configurations, evaluating the performance for each subgroup within each said subgroup configuration, selecting one said subgroup configuration as optimal, and determining whether each of said subgroups within said selected subgroup configuration satisfies said decomposition criterion until the groups satisfy said decomposition criterion; and discontinuing decomposition when said subgroups satisfy said decomposition criterion.

* * * * *